(No Model.)

G. W. HOOPER.
ELECTRIC TROLLEY.

No. 543,529. Patented July 30, 1895.

Witnesses
Geo. E. Trich.
D. W. Naylor

Inventor
G. W. Hooper
By Attorneys
Pattison & Nesbit

UNITED STATES PATENT OFFICE.

GEORGE W. HOOPER, OF ROCHESTER, NEW YORK, ASSIGNOR TO JAMES S. BAKER, OF SAME PLACE.

ELECTRIC TROLLEY.

SPECIFICATION forming part of Letters Patent No. 543,529, dated July 30, 1895.

Application filed September 11, 1894. Serial No. 522,727. (No model.)

*To all whom it may concern:*

Be it known that I, GEORGE W. HOOPER, of Rochester, in the county of Monroe and State of New York, have invented certain new and useful Improvements in Electric Trolleys; and I do hereby declare the following to be a full, clear, and exact description of the invention, such as will enable others skilled in the art to which it pertains to make and use it, reference being had to the accompanying drawings, which form part of this specification.

My invention relates to improvements in electric trolleys; and it consists in the construction and combination of parts which will be fully described hereinafter, and particularly pointed out in the claims.

The primary object of my invention is to provide a trolley-wheel of the construction hereinafter shown and described, whereby bushings are provided within which a hollow shaft of the wheel revolves and the said bushings at opposite sides of the yoke held together by means of a connecting bolt or screw, thus enabling me to make a very light yoke and at the same time prevent it from spreading.

Another object of my present invention is to provide the bushings with angular portions fitting within angular portions of the ends of the yoke to prevent the bushings from revolving and to cut the bushings away to form inlets for lubricant from the surrounding chambers and at the same time place around the connecting bolt or screw the contact-points and springs for holding them in place, whereby the contact-points and springs cannot become disarranged, as will be readily understood.

Figure 1:
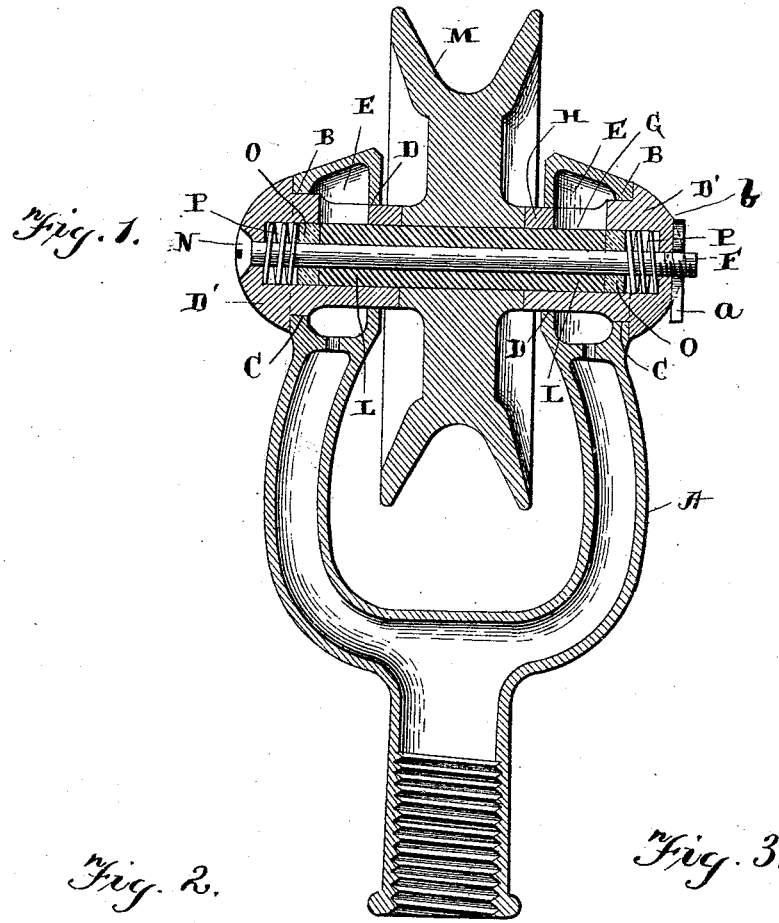
Figure 2:
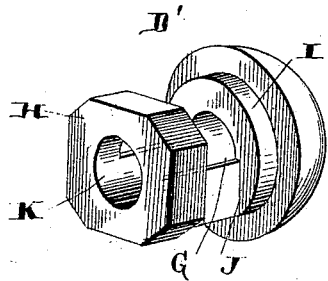
Figure 3:
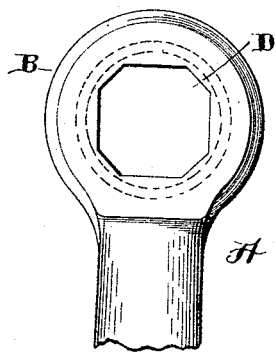

In the accompanying drawings, Figure 1 is a vertical section taken through the yoke and longitudinal the shaft of the trolley. Fig. 2 is a detached perspective view of one of the bushings. Fig. 3 is an inside view of one end of the yoke, showing the angular opening therein.

Reference being had to the drawings, A indicates a yoke, which may be of the ordinary external contour or of that here shown, and which yoke is preferably made hollow for the purpose of being light and affording a receptacle for a lubricant. The ends B of the yoke are provided at their outer faces with the circular openings C and at their inner faces with the angular openings D. The walls of the ends of the yoke are made to form annular chambers E around the bushings G, as clearly shown in Fig. 1, which form receptacles for a suitable lubricant.

The bushings G are provided with angular inner ends H, fitting within the angular inner openings of the ends of the yoke, and with the outer circular portions I, fitting within the circular openings at the outer faces of the ends of the yoke, and between the angular and circular portions the yoke is cut out, as shown at J, which permits a free circulation of the lubricant within the yoke, as will be clearly understood. The inner ends of these bushings G are provided with the circular openings K, which receive the ends of the hollow shaft L. This hollow shaft L is rigidly secured to the trolley-wheel M, and the ends of this shaft have bearings, as just intimated, within the openings in the bushings.

Passing through the hollow shaft of the trolley-wheel is a clamping bolt or screw N, which unites and draws together the bushings, as clearly shown. The contacts O and the springs P, which are placed within the bushings, are placed around the clamping bolt or screw, and are therefore held in their proper position without any possibility of disarrangement. I here show and prefer to use a clamping-screw which has one end screw-threaded and passing within the end of one of the bushings, as shown at Q, and provided with an opening F, through which a key $a$ passes. This key fits within a slot $b$ made in the outer face of one of the bushings, which prevents the screw from turning and becoming loose, as will be readily conceived. Owing to this construction the bushings are made removable for the purpose of inserting new ones should they become worn, and also for the purpose of allowing ready access to the contacts for replacing them or correcting any trouble which may arise, and owing to the clamping bolt or screw which passes through the hollow shaft of the trolley-wheel and which unites the bushings the yoke is prevented from spreading, which is a common defect in trolleys.

Having thus fully described my invention, what I claim, and desire to secure by Letters Patent, is—

1. A trolley comprising a yoke having transverse openings in its ends, a wheel having a rigid hollow shaft, hollow bushings extending inward through said openings, and receiving and forming bearings for said rigid hollow shaft and held against inward movement in said yoke, and a clamping bolt passing through said shaft and bushings for uniting them and holding the ends of the yoke against spreading.

2. A trolley comprising a yoke having transverse openings in its ends, a wheel having a rigid hollow shaft, hollow bushings having heads or flanges at their outer ends engaging the yoke and inwardly extending portions receiving and forming bearings for the ends of said rigid hollow shaft, and a clamping bolt passing freely through said hollow shaft and uniting said bushings and holding the yoke against spreading, substantially as shown.

In testimy whereof I affix my signature in presence of two witnesses.

GEORGE W. HOOPER.

Witnesses:
HENRY BLACKMAN,
FRANK E. BENNETT.